UNITED STATES PATENT OFFICE.

EDWARD H. FENNESSY, OF NEWTON, MASSACHUSETTS.

IMPROVEMENT IN BRONZE-DRESSINGS FOR LEATHER.

Specification forming part of Letters Patent No. 164,678, dated June 22, 1875; application filed May 31, 1875.

*To all whom it may concern:*

Be it known that I, EDWARD H. FENNESSY. of Newton, in the county of Middlesex and State of Massachusetts, have invented an Improved Bronze-Dressing for Leather; and I hereby declare that the following is a full, clear, and exact description of the same.

The object of my invention is to provide a cheap and brilliant bronze-dressing for leather, to be used particularly for bronzing boots and shoes; and my invention consists in a preparation composed of aniline red, blue, violet, or purple, or a mixture of two or more of these colors, dissolved in a suitable acid, and brought to the desired consistency by the addition of an acid solution of gelatine or a gum soluble in water.

To enable others skilled in the art to understand and use my invention, I will proceed to describe the manner in which I have carried it out.

I take six ounces of aniline red and two ounces of aniline blue, violet, or purple, and dissolve them in one quart of acetic acid, heating the mixture slightly in order to accelerate the operation, after which it is allowed to become cool. I then dissolve in a separate vessel thirty-two ounces of gelatine in one gallon of acetic acid, and add this mixture to that first described, after it has become cool, to give the required consistency to the compound. The whole is then thoroughly stirred together, when it is ready for use.

Any suitable acid other than acetic acid may be used; and in lieu of gelatine, a gum soluble in water—for instance, gum arabic; or gum tragacanth may be employed, if desired.

I do not confine myself to the exact proportions of aniline color or acid above stated, as the quantities may be varied somewhat, according to the shade of bronze required; and any one of the aniline colors above referred to may be used singly instead of a mixture of these colors; but I prefer the mixture first described, as it produces a more desirable shade of bronze. The quantity of gelatine or gum used may also be varied, according to the consistency required.

The dressing is used with a soft brush, and give a brilliant bronze finish to the surface of the leather to which it is applied.

What I claim as my invention, and desire to secure by Letters Patent, is—

A bronze leather-dressing, consisting of one or more aniline colors and gelatine or other suitable gum compounded with acid, substantially as described.

Witness my hand this 27th day of May, A. D. 1875.

EDWD. H. FENNESSY.

In presence of—
P. E. TESCHEMACHER,
W. J. CAMBRIDGE.